(12) United States Patent
Anglin et al.

(10) Patent No.: US 8,214,377 B2
(45) Date of Patent: Jul. 3, 2012

(54) METHOD, SYSTEM, AND PROGRAM FOR MANAGING GROUPS OF OBJECTS WHEN THERE ARE DIFFERENT GROUP TYPES

(75) Inventors: Matthew Joseph Anglin, Tucson, AZ (US); David Maxwell Cannon, Tucson, AZ (US); Avishai Haim Hochberg, San Jose, CA (US); Mark Alan Haye, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1782 days.

(21) Appl. No.: 10/410,072

(22) Filed: Apr. 7, 2003

(65) Prior Publication Data

US 2004/0199521 A1  Oct. 7, 2004

(51) Int. Cl.
G06F 7/00 (2006.01)
G06F 13/00 (2006.01)
(52) U.S. Cl. .................... 707/756; 711/161; 711/162
(58) Field of Classification Search .............. 707/756; 711/161, 162
See application file for complete search history.

(56) References Cited

U.S. PATENT DOCUMENTS 5,797,128 A   8/1998  Birnbaum
5,828,842 A  10/1998  Sugauchi et al.
6,006,234 A * 12/1999  Govindarajan et al. ... 707/103 R
6,226,792 B1  5/2001  Goiffon et al.
2003/0110179 A1* 6/2003  Barton ........................ 707/101

OTHER PUBLICATIONS

Leins et al., "Tivoli Storage Manager Version 3.7.3 & 4.1: Technical Guide," IBM Technical Support Organization, Document No. SG24-6110-00, Sep. 2000, Chapter 3, pp. 81-110, Chapter 6, pp. 195-200.*
"Tivoli Storage Manager Version 3.7.3 & 4.1: Technical Guide", by: Leins, Published: Sep. 2000.*
U.S. Appl. No. 10/120,015, entitled "Method, System, and Program for Grouping Objects", inventors are C. Bolik, D.M. Cannon, C.S. Dawson, A.H. Hochberg, M.A. Kaczmarski, J.P. Smith, C. Zaremba, filed Apr. 2, 2002, 41 pages.

* cited by examiner

*Primary Examiner* — Apu Mofiz
*Assistant Examiner* — Chelcie Daye
(74) *Attorney, Agent, or Firm* — David W. Victor; Konrad Raynes and Victor LLP

(57) ABSTRACT

Provided are a method, system, and program for managing storage objects. Storage object information is provided for each storage object, wherein the storage object information indicates at least one of a plurality of groups associated with the storage object, and wherein each storage object is capable of being associated with a plurality of groups and different group types. Group information is provided for each group indicating a group identifier, storage objects associated with the group, and a group type.

48 Claims, 9 Drawing Sheets

Storage Object Entry

Group entry

METHOD, SYSTEM, AND PROGRAM FOR MANAGING GROUPS OF OBJECTS WHEN THERE ARE DIFFERENT GROUP TYPES

BACKGROUND OF THE INVENTION

1. Field of the Invention

The present invention relates to a method, system, and program for managing groups of objects when there are different group types.

2. Description of the Related Art

A storage management program, such as International Business Machines Corporation (IBM®) Tivoli® Storage Manager,** maintains an image of the data and programs on systems in a network. The storage management program uses its own storage, such as tape cartridges, as a repository for managed data. In the event of a system failure or other event that results in a loss of data on the network systems, the storage management program may be used to restore the data and programs from the storage repository.

IBM, Tivoli, and Tivoli Storage Manager are trademarks and/or registered trademarks of International Business Machines Corporation.

In the prior art, the storage management program may define a group as specific objects to be managed, such as data files, database files, programs, etc. A group is a collection of distinct objects, which are managed as a single logical entity to maintain referential consistency in the event that these objects are accessed from the storage management program. The objects are grouped because they are related to each other in a meaningful way, such as a set of files that together make up a software application, e.g., a database. When storing these objects, the storage management program processes all the received objects specified in the group, writes the received objects to its own storage, and then saves metadata for the objects showing that they are grouped together.

The copending and commonly assigned patent application entitled "Method, System, and Program for Grouping Objects" having U.S. application Ser. No. 10/120,015, filed on Apr. 10, 2002, discloses techniques for managing storage objects so the objects may be associated with different object groups in a flexible manner, and that storage objects can be added as members to multiple object groups and storage objects can be added to or removed from object groups across backup transactions.

SUMMARY OF THE PREFERRED EMBODIMENTS

Provided are a method, system, and program for managing storage objects. Storage object information is provided for each storage object, wherein the storage object information indicates at least one of a plurality of groups associated with the storage object, and wherein each storage object is capable of being associated with a plurality of groups and different group types. Group information is provided for each group indicating a group identifier, storage objects associated with the group, and a group type.

In further implementations, storage management operations are performed on storage objects that are dependent on the type of group to which the storage object belongs, wherein one storage operation performed with respect to a target storage object is implemented differently depending on the type of group to which the target storage object belongs.

In further implementations, each storage object is capable of being associated with a plurality of groups, wherein at least two of the associated groups are different group types.

In yet further implementations, storage object information is processed for one storage object to remove. If the storage object is a member of multiple groups, then the storage object is removed by modifying the storage object entry to remove a group identifier of one group from which the storage object can be removed, wherein the storage object entry is capable of indicating multiple groups to which the storage object belongs.

Described implementations provide techniques for allowing managed storage objects to be associated with different group types, and providing techniques for maintaining group type consistency and integrity when removing an object that is a member of multiple groups, whether of the same or different group types.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
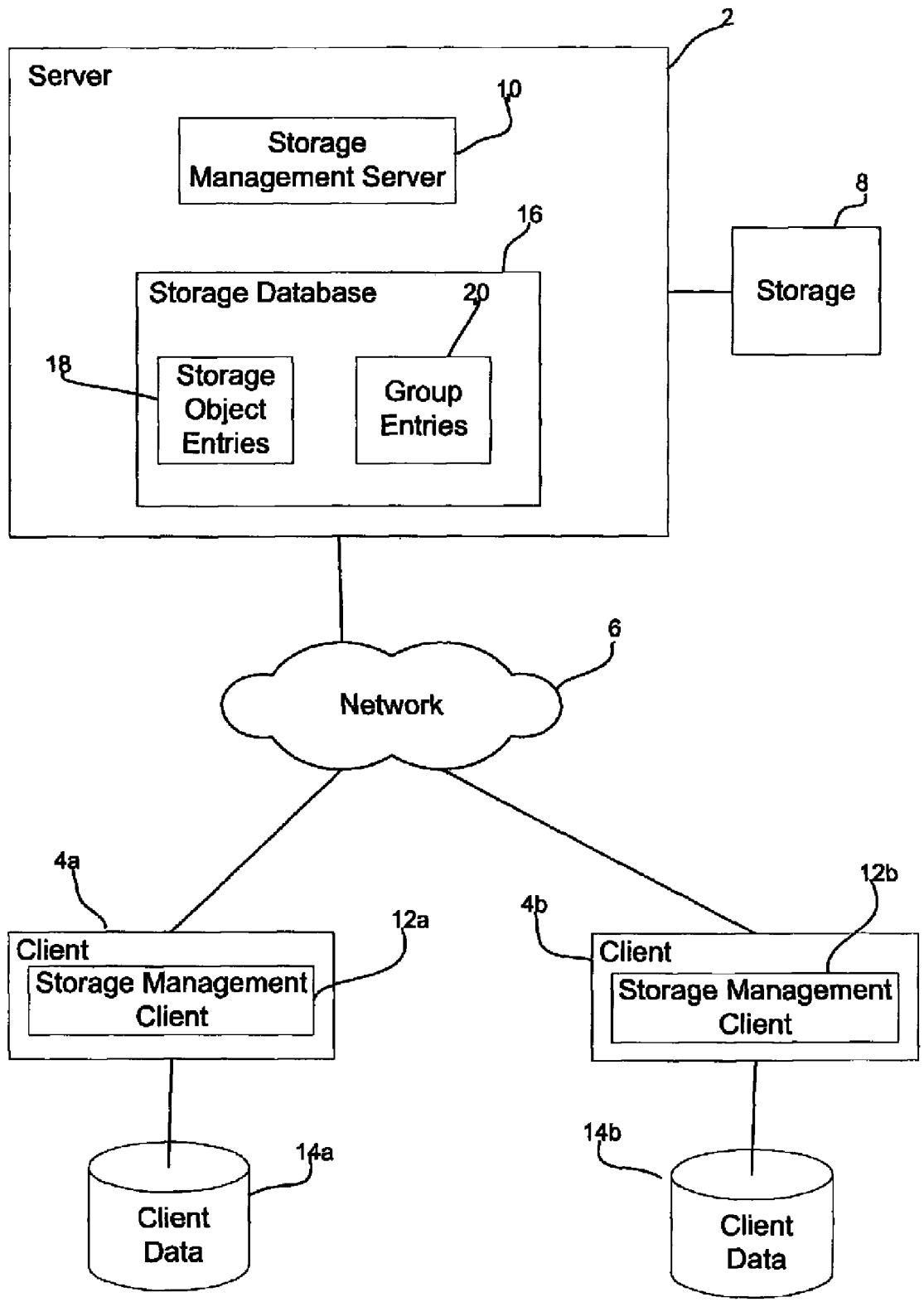
FIG. 1 illustrates a computing environment in which described implementations are realized.

FIG. 1 illustrates a computing environment in which described implementations may be realized. A server 2 is in communication with multiple client computers 4a, 4b over a network 6. The network 6 may comprise any network known in the art, such as the Internet, an Intranet, Storage Area Network (SAN), Local Area Network (LAN), Wide Area Network (WAN), etc., using any network protocol known in the art. The server 2 maintains a storage 8 to store data from the clients 4a, 4b. The storage 8 may comprise any non-volatile storage system known in the art, such as a one or more hard disk drives, a Direct Access Storage Device (DASD), Just a Bunch of Disks (JBOD), a Redundant Array of Independent Disks (RAID), tape library, optical library, etc. The server 2 includes a storage management server program 10 that is capable of performing storage related operations of data objects received from storage management client programs 12a, 12b. The storage management operations may comprise backup operations, archival operations, hierarchical storage management (HSM) related operations, or any type of storage management operations known in the art. The storage management clients 12a, 12b execute on the clients 4a, 4b and include the capability of transmitting objects for storage to the server 2. The clients 4a, 4b are capable of accessing client data 14a, 14b, which includes objects that the clients can transmit to the server 2. Although two clients 4a, 4b are shown, there may be only one client or more than two clients 4a, 4b on the network 6. Further, although only one server 2 is shown FIG. 1, in alternative implementations there may be multiple servers, in that the storage management server 2 and storage database 16 may be distributed across multiple server machines. Still further, the components may be replicated on multiple machines.

When writing storage objects received from the storage management clients 12a, 12b to the storage 8, the storage management server 10 would add records into a storage database 16 providing searchable and indexable information on stored objects. The storage database 16 may be implemented with any database architecture known in the art, such as a relational database, object oriented database, a table, etc. If the storage objects are associated with an object group, then indication of the associated object group would be included with the object information in the storage database 16. The storage database 16 includes storage object entries 18 providing information on storage objects managed by the storage management server 10 and group entries 20 that provide information on different groups of storage objects. The storage object entries 18 and group entries 20 may be maintained in database tables or some alternative data structure for storing information known in the art.

Figure 2A:
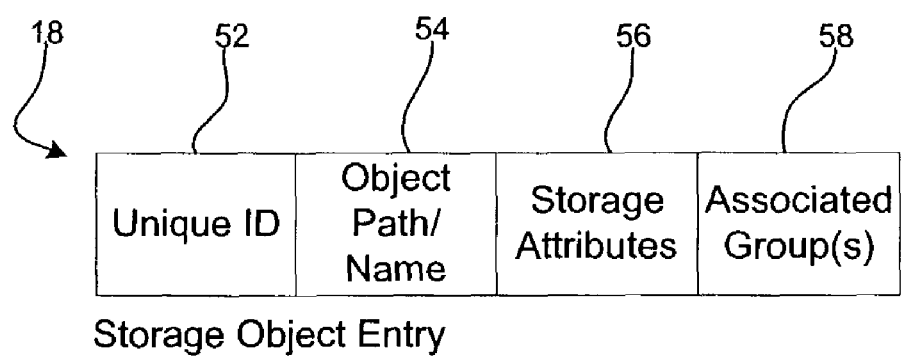
FIGS. 2a and 2b illustrate data structures maintaining information on groups of storage objects in a storage database in accordance with implementations of the invention.

FIG. 2a illustrates the data structure of a storage object entry 18 or record in the storage database 16 that is added whenever a storage object is confirmed as written to the storage 8. The entry 18 includes a unique identifier 52 that uniquely identifies the storage object and entry in the storage database 16. An object path/name field 54 includes the directory path and the file name of the storage object that was received from the client. The object path/name field 54 may include the name of the location of the storage object in the file directory on the client that submitted the object. The storage attributes field 56 provides information on the storage operation, such as administrator defined storage policies (e.g., attributes that control the generation, destination, and expiration of storage objects). The associated groups(s) field 58 indicates one or more groups to which the storage object belongs. The field 58 may specify any number of groups, i.e., zero or more, by listing one or more groups or having a pointer to a data structure indicating multiple groups with which the current object is associated.

Figure 2B:
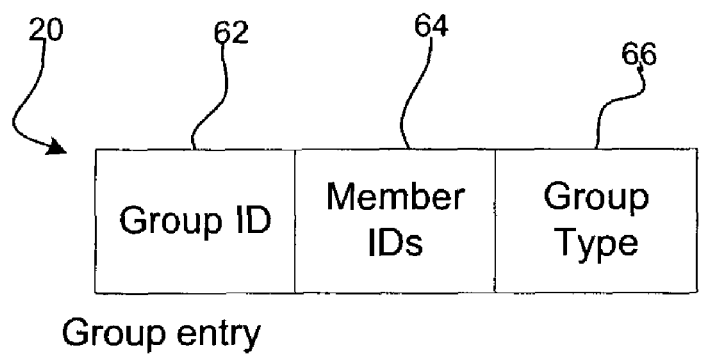

FIG. 2b illustrates a group entry 20, where each entry includes, a group ID 62 and the member IDs 64 of any storage objects that are members of the group identified in field 62. The group entry 20 further includes a type field 66 indicating a type of the group. A group type indicates a relationship of the group members. For instance, in a peer group all storage object members of the group must be maintained and valid else the group is invalid. The group leader for a peer group may be represented by a storage object entry 18 that does not correspond to a particular file in the storage 8, but is an entry 18 created to represent a group.

A delta group refers to a grouping of storage objects where one object is a base object representing a base image of a set of files or objects and the delta object members comprising data that has changed since the base object, such as a differential backup with respect to the base image. The group leader of the delta group comprises the storage object entry corresponding to the base object and the group members comprise the delta objects.

An attribute group refers to a group comprising a base storage object and one or more attribute objects that provide metadata on the base storage object. The base storage object comprises the group leader and the attribute objects comprise the members of the attribute group. The attribute object members may include any metadata on the base storage object, such as a table of contents that provides offset information into the base object for individual elements of an image.

In the described implementations, groups may be defined by the administrator or the storage management clients 12a, 12b when storing related files or objects that together comprise a database. Storage objects may be defined as part of a storage group by adding the group identifier of the one or more groups in which the storage object is a member to the group field 58 of the storage object entry 18. Furthermore, for every group to which the object belongs, the member IDs field 64 is updated for the group entry. The "group" concept implements an association of related files/objects, which may be part of the same storage operation, and treated as part of a same storage entity. Further, the same file, i.e., drive, path, and file name, may have multiple entries in the storage database 16 for different versions of such file. Such different versions of a file may be associated with different storage groups. Additionally, a storage object may not be associated with any group. Moreover, with the described implementations, each storage object is capable of being associated with a plurality of different group types.

In certain implementations, a group is identified by a "group leader", which is a storage object entry 18 in the storage database 16 having a unique ID 52 that also functions as the unique group number indicated in the group ID field 62 of the group entry 20. The attributes field 56 for the group leader may be left empty or may indicate policies that apply to all objects in the group and/or the status of the group, e.g., active or inactive. Thus, when the group leader is expired or deleted, all the objects that are members of that group would also be expired or deleted, if they do not also belong to other groups. When a peer group leader is restored, all objects belonging to that group would also be restored. Restoring objects may comprise copying the object data out of the storage 8 and returning the data to the client 4a, 4b through a network 6. However, when a group leader is moved, objects that are members of that group would not necessarily be moved, since group members may be stored on different media. A "move" operation may involve movement within the storage hierarchy or movement of the data within storage 8 to a different media, where storage 8 may comprise different storage media types arranged hierarchically. In this way, all members within a group are managed based on the attributes of the group leader. The group members may inherit their leader attributes or include the leader attributes set in their own individual attribute fields. The object path/name field 54 in the group leader entry 50 may be a name assigned to the group and, in certain implementations, not an actual file path and name because the group entry is used to relate member objects and there may be no file for the group leader. A group leader may be a member of one or more other super groups, i.e., a group of groups. In such case, the unique ID of a super group is indicated in the group field 58 of group leaders within that super group.

Described implementations provide management of storage objects associated with different group types. Many type of storage object management operations would have to take into account group characteristics and that a storage object may be a member of multiple group types. Different group types may have different and conflicting management requirements, thereby requiring special considerations when performing storage object management operations. One example of a storage object operation is found in FIGS. 3-7 which illustrate operations perform to expire storage group objects.

Figure 3:
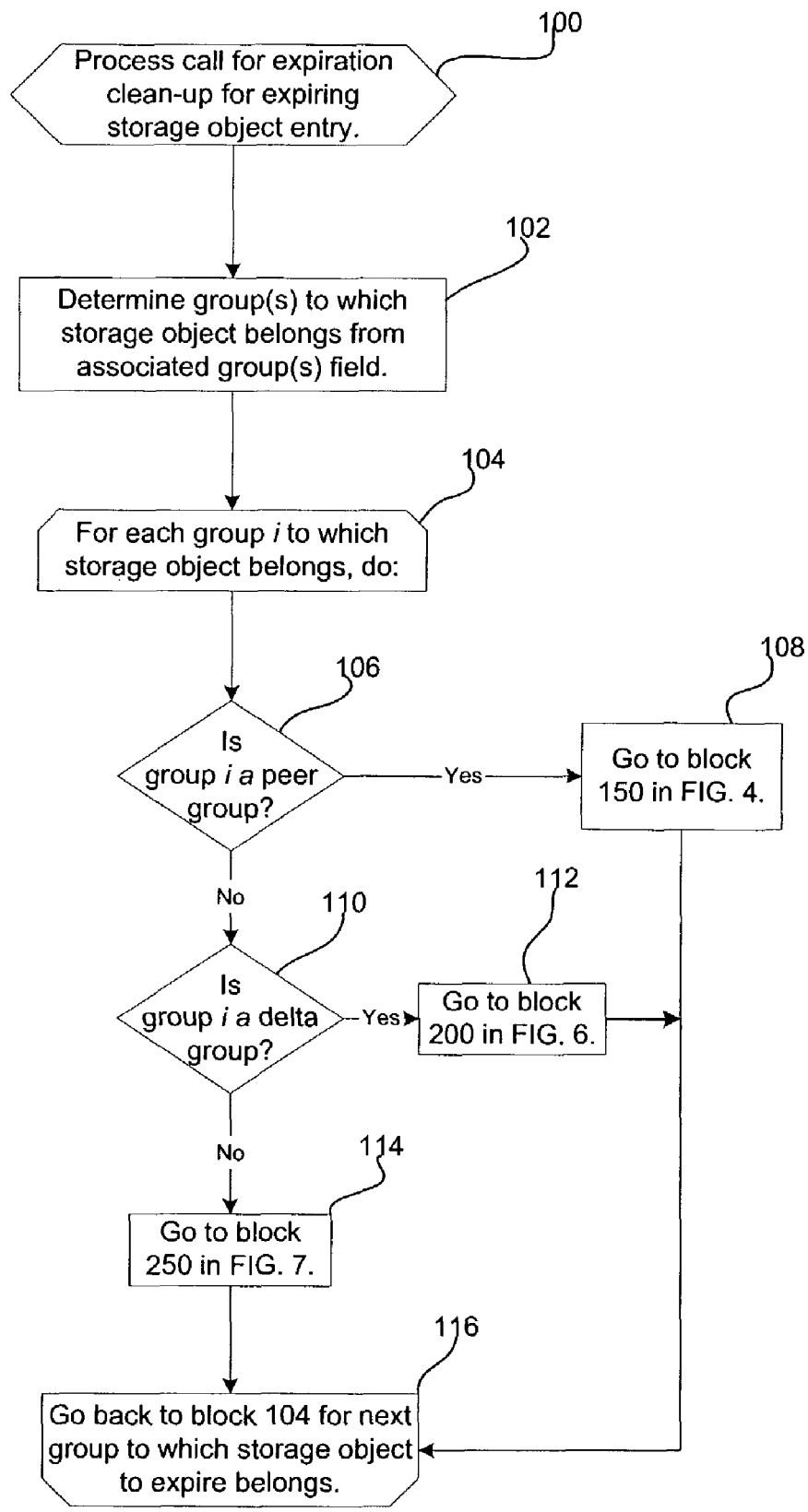
FIGS. 3-9 illustrate logic to manage storage objects in the storage database in accordance with implementations of the invention.

FIG. 3 illustrates operations performed to expire storage objects according to expiration criteria determined by the type of groups to which the storage object to expire belongs. For each storage object expired, a call would be made for expiration clean-up at block 100 in FIG. 3 for the target storage object entry 18 corresponding to the storage object to expire. With respect to FIG. 3, upon initiating (at block 100) the call for expiration clean-up of the target storage object entry 18 being expired, the storage management server 10 determines (at block 102) the one or more groups to which the storage object belongs as indicated in the associated group(s) field 58 (FIG. 2*a*) of the storage object entry 18 for the expiring storage object. For each group i to which the expiring storage object belongs, a loop iteration is performed at blocks 104 through 116. If (at block 106) the group i is a peer group, then control proceeds (at block 108) to block 150 in FIG. 4.

Figure 4:
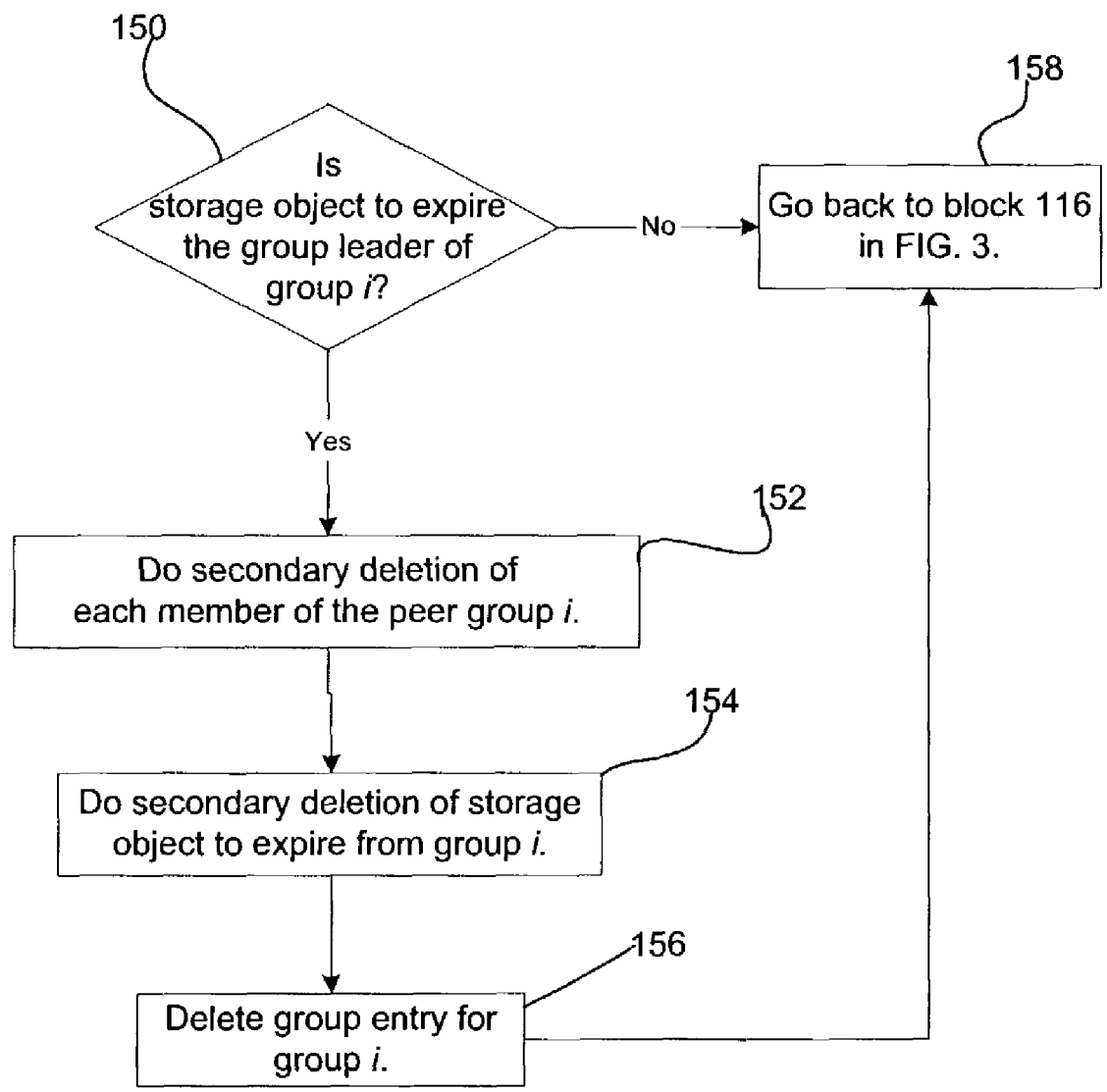
Figure 5:
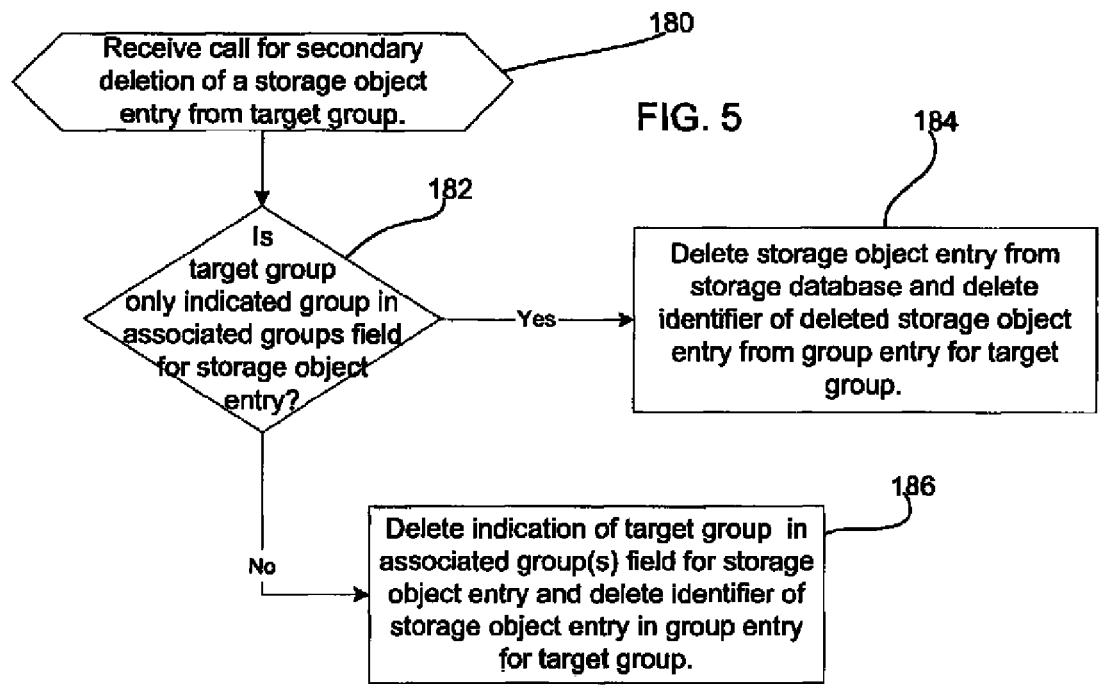

With respect to FIG. 4, if (at block 150) the storage object to expire is the group leader of the group i, which may be determined if the unique ID 52 (FIG. 2*a*) of the storage object entry 18 is the same as the group ID 62 (FIG. 2*b*) of group i, then a secondary deletion (as shown in FIG. 5) is performed (at block 152) to remove all the storage objects in group i by removing the identifier for each storage object entry 18 for each member of group i from the group entry 20. At block 154, the storage management server 10 deletes the indication of group i in the associated group(s) field 58 for member each member of the group and then does a secondary deletion of the storage object to expire from group i. The group entry 20 for group i is further removed (at block 156) from the storage database 16. After expiring all member storage objects with respect to peer group i, the storage management server 10 performs a secondary deletion of the storage object to expire from group i. The secondary deletion ensures that a storage object and corresponding storage object entry are only removed if the storage object is not a member of any further groups after eliminating the relationship between the storage object and group i.

FIG. 5 illustrates the steps of the secondary deletion operation called at block 180 for a specified storage object entry from a target group. If (at block 182) the target group is the only indicated group in the associated groups field 58 (FIG. 2*a*) for the specified storage object entry, then the storage management server 10 deletes (at block 184) the specified storage object entry 18 from the storage database 16 and deletes the identifier of the deleted storage object entry 18 from the group entry 20 for the target group. Otherwise, if the specified storage object entry is a member of multiple groups, then the storage management server 10 deletes (at block 186) indication of the target group from the associated group(s) field 58 for the storage object entry and deletes the unique ID 52 of the specified storage object entry 18 from the member IDs field 64 in the group entry 20 (FIG. 2*b*) for the target group. Thus, a secondary deletion only removes the relationship if the storage group entry to delete from a group is a member of multiple groups in addition to the target group from which the storage object is being removed or removes the storage object entry itself if the storage object entry is only a member of the target group.

After deleting the storage object entry and entire peer group i (at block 156) or if the storage object to expire is a member, and not group leader, of a peer group (from the no branch of block 150), control proceeds (at block 158) to block 116 in FIG. 3 to consider the next group i to which the storage object entry 18 to expire belongs.

Figure 6:
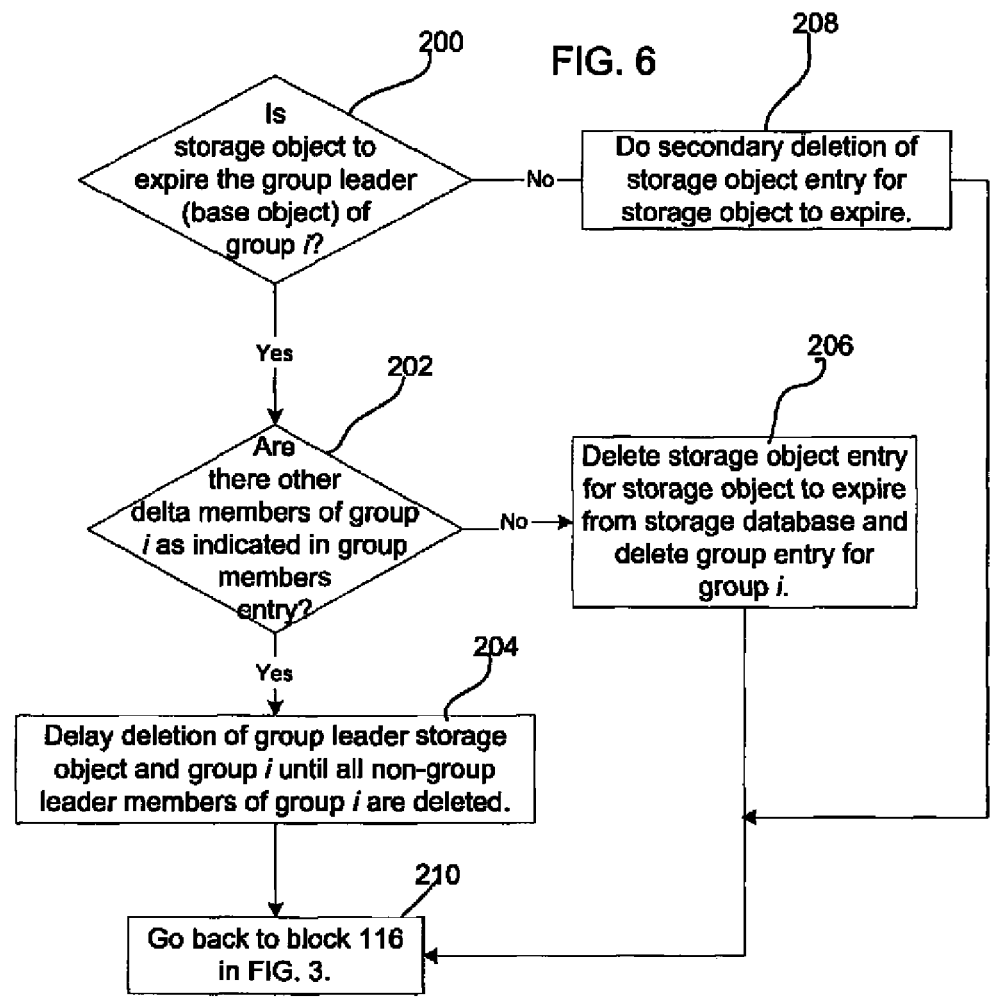

If (at block 110) the group i is a delta group type 66, then control proceeds (at block 112) to block 200 in FIG. 6. With respect to FIG. 6, the storage management server 10 determines (at block 200) whether the storage object to expire is the group leader of the delta group i, i.e., the base object. If (at block 200) the storage object entry is a group leader of the delta group i, i.e., the unique ID 52 of the storage object entry to expire matches the group ID 62 (FIG. 2*b*) of group i, and if (202) there are other delta members of group i as indicated in the member IDs field 64, then the deletion of the storage object to expire is delayed until all the delta members are deleted. At such time when all non-group leader delta members are deleted, the group leader storage object may then be removed. The deletion of the object is delayed (at block 204) until after all the delta group members have expired because the delta group members require the presence of the base group to remain valid. If (at block 202) there are no delta members in the delta group i, then the storage management server 10 deletes (at block 206) the storage object entry 18 for the object to expire and deletes the group entry 20 for group i from the storage database 16. If (at block 200) the storage object to expire is a delta member of the delta group i, i.e., not the group leader, then the storage management server 10 performs a secondary deletion (at block 208) of the storage object entry 18 for the storage object to expire. From blocks 204, 206 or 208, control proceeds (at block 210) back to block 116 in FIG. 3 to process the next group i to which the storage object entry 18 to expire belongs.

Figure 7:
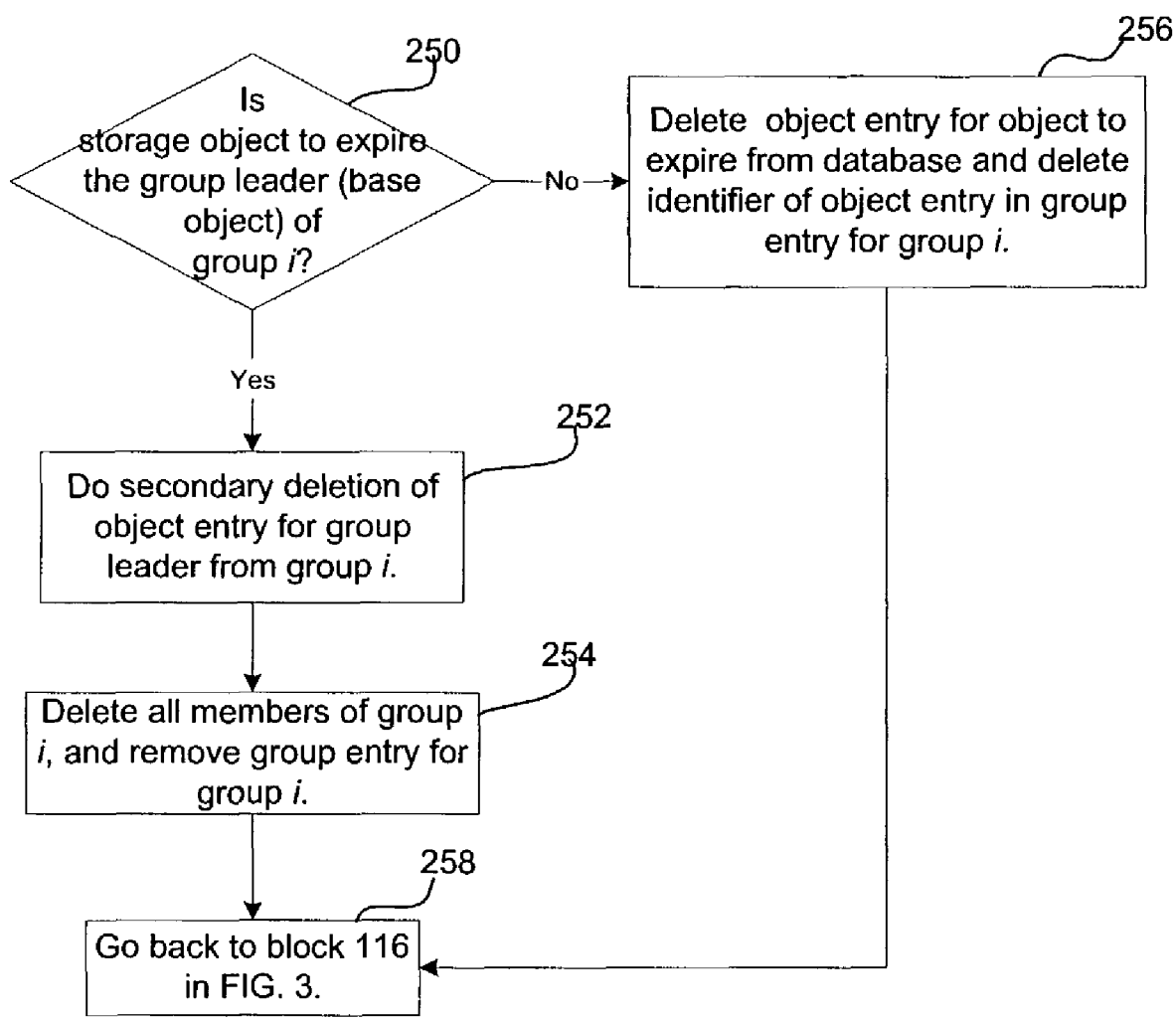

If (from the no branch of block 110) group i is an attribute group, as indicated in the group type field 66 of the group entry 20 for group i, then control proceeds (at block 114) to block 250 in FIG. 7 to handle the expiration for an attribute type group. If (at block 250) the storage object to expire is the group leader of attribute group i, i.e., is the base object, then a secondary deletion of the storage object entry is performed (at block 252), which involves the logic of FIG. 5. All the attribute members of attribute group i are also removed (at block 254) and the group entry 20 for group i is also removed. If (at block 250) the storage object to expire is an attribute storage object, i.e., not the group leader, then the storage management server 10 deletes (at block 256) the storage object entry 18 for the storage object to expire from the storage database 16 and deletes the identifier of the storage object entry 18 from the member IDs 64 of the group entry 20 (FIG. 2*b*) for attribute group i. From block 254 or 256 control proceeds (at block 258) back to block 116 in FIG. 3 to process a next group including the storage object to expire.

Figure 8:
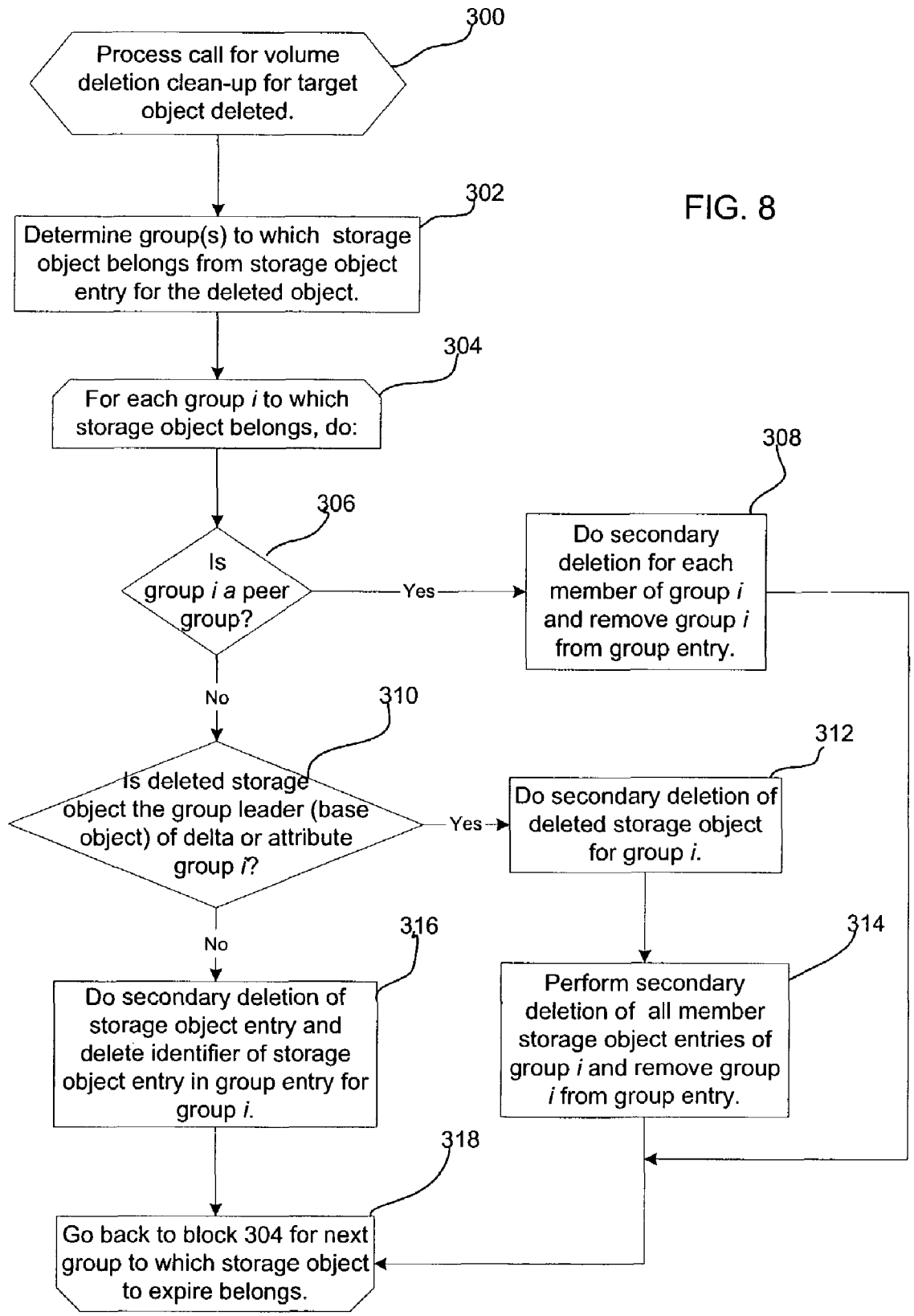

FIG. 8 illustrates logic implemented in the storage management server 10 to clean-up the storage database 16 in the event of the deletion of a volume or other portion of the storage 8. The logic of FIG. 8 would be performed for every target storage object removed as part of the volume deletion. Upon invoking the volume deletion clean-up (at block 300), the storage management server 10 determines (at block 302) the group(s) to which the deleted storage object belongs from the associated group(s) field 58 of the storage object entry 18 for the deleted storage object. A loop is then performed from blocks 304 to 318 for each group i to which the storage object belongs. If (at block 306) group i is a peer group, then a secondary deletion (FIG. 5) is performed (at block 308) for each member storage object entry of group i, indicated in the member IDs field 64 of the group entry 20 (FIG. 2*b*) for peer group i and the group entry 20 for peer group i is deleted, thereby eliminating peer group i. In the context of volume deletion, the secondary deletion only deletes the relationship indicating the group to which the deleted storage object belongs and not the storage object itself, because the storage object would have been removed as a result of the volume deletion. If (at block 310) the storage object to delete is a group leader of a delta group or attribute group type, then a secondary deletion (FIG. 5) is performed (at block 312) of the deleted storage object and a secondary deletion is performed (at block 314) of all member storage data object entries for group i indicated in the member IDs field 64 of the group entry 20 of group i. As discussed, a storage object is a group leader of a delta group or attribute group if the unique ID 52 of the storage object entry 18 (FIG. 2a) has the same ID as the group ID field 62 of the group entry 20 for the subject group and the group type field 66 of the group entry 20 (FIG. 2b) for the subject group indicates a delta or attribute group. If (at block 310) the storage object is a non-group leader member of a delta or attribute group, then a secondary deletion (FIG. 5) is performed (at block 316) of the storage object entry 18 for the deleted storage object and the identifier of the storage object entry in the member IDs field 64 of the group entry 20 for group i is deleted. After removing the storage object entries for the deleted storage object and any related storage object entries representing storage objects that require the deleted storage object at blocks 308, 312, 314, and 316, control proceeds (at block 318) back to block 304 to process the storage database 18 for any further storage objects deleted as part of the volume deletion.

Figure 9:
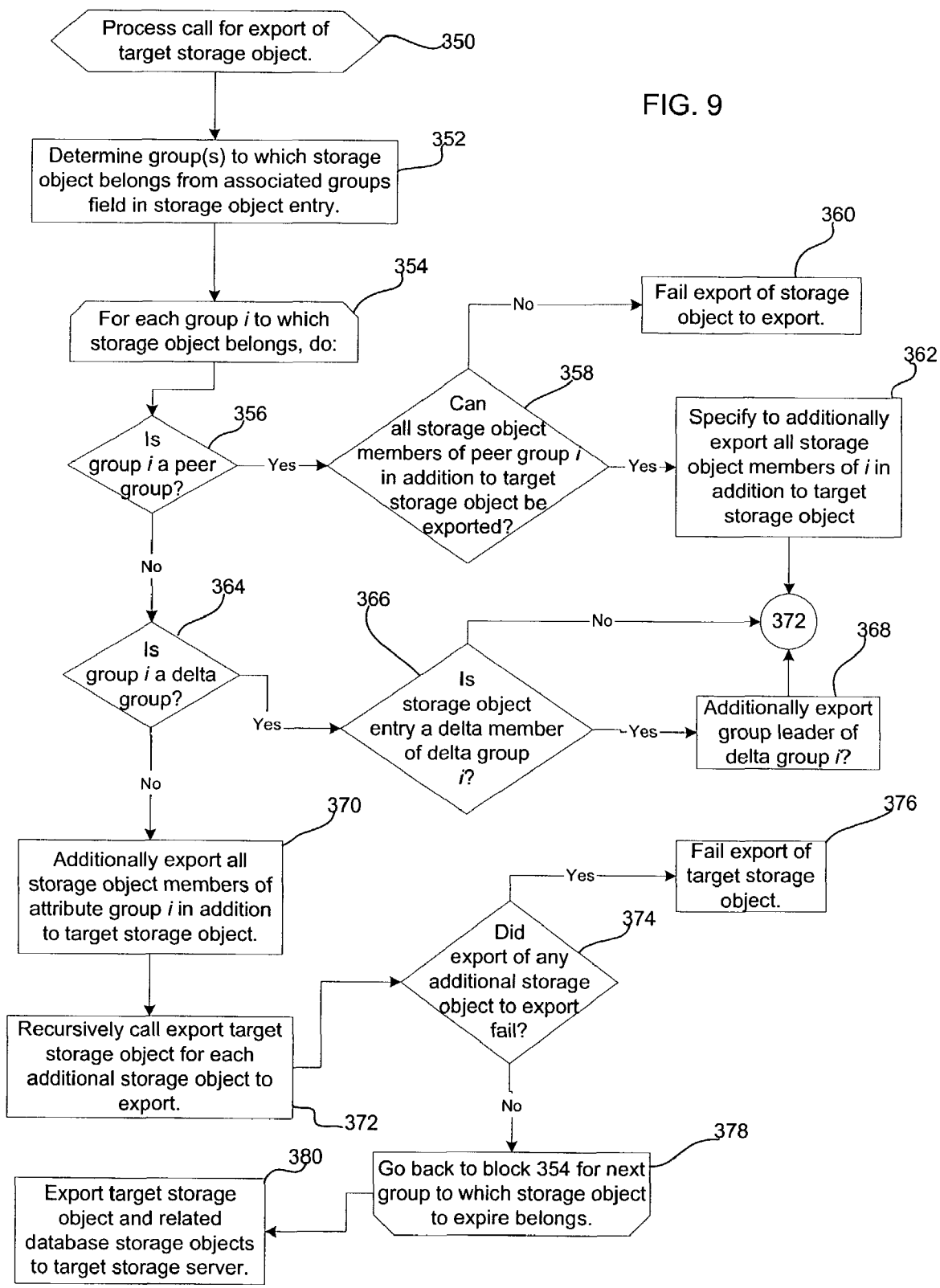

FIG. 9 illustrates logic implemented in the storage management server 10 to export storage objects in the storage 8 to another server, which may have a similar configuration to server 2. The export operation exports both the storage objects and all storage object entries 18 and group entries 20 related to the exported storage objects. The logic of FIG. 9 is performed for each storage object to export. Upon initiating (at block 350) a call to export a target storage object, the storage management server 10 determines (at block 352) group(s) to which the storage object belongs from the associated groups field 58 in the storage object entry 18 for the target storage object. A loop is then performed at blocks 354 through 378 for each group i to which the target storage object belongs. If (at bock 356) group i is a peer group, then a determination is made (at block 358) of whether all storage object members of peer group i in addition to the target storage object can be exported. If all the storage object members of peer group i cannot be exported, then the export of the target storage object fails (at block 360); otherwise, if all can be exported, then the storage management server 10 specifies (at block 362) to additionally export all storage object members indicated in field 64 for the group entry 20 of group i in addition to the target storage object.

Figure 10:
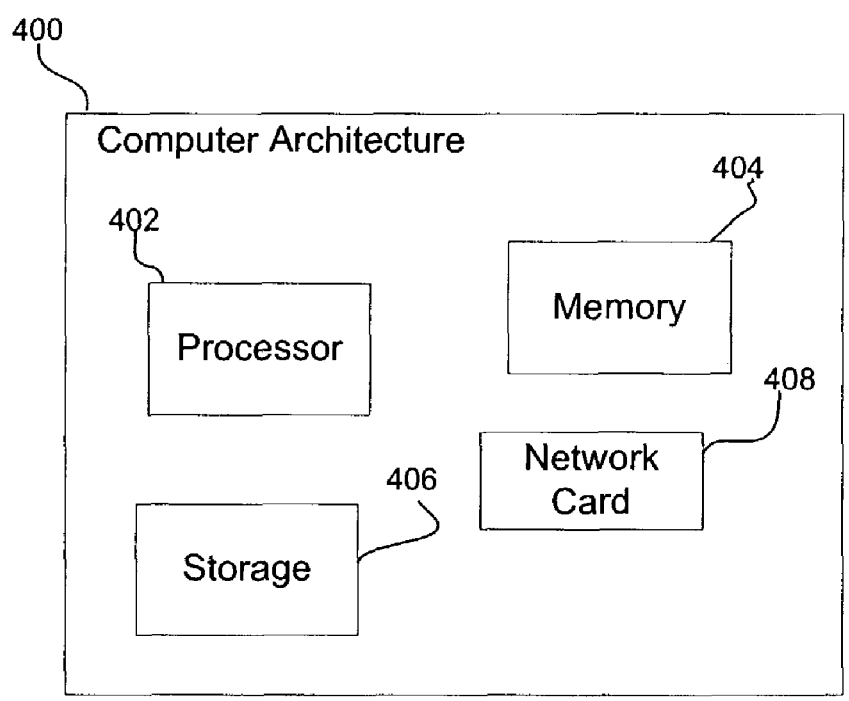
FIG. 10 illustrates further details of the computing environment of FIG. 1 in accordance with certain implementations of the invention.

If (at block 364) group i is a delta group and if (at block 366) the storage object entry 18 is a non-group leader member of the delta group, then the group leader of the delta group is additionally exported (at block 368) because a delta group member needs the group leader, or base object, to be valid. If group i is an attribute group (from the no branch of block 364), then all the storage object members of attribute group i, represented by the storage object entries 18 indicated in the member IDs field 64 (FIG. 2b) of the group entry 20 of attribute group i, are additionally exported. If additional storage objects are to be exported, as determined at blocks 362, 368, and 370, then the process described in FIG. 10 is recursively called (at block 372) with the storage object entry for each additional storage object to export called as the target storage object entry in order to export any additional storage objects that must be exported in order for the export of the target storage object to be valid. After completing the recursive call with respect to the additional export storage objects, the storage management server 10 determines (at block 374) whether the export of any additional storage object to export failed. If so, the export of the target storage object is failed (at block 376). Otherwise, control proceeds (at block 378) back to block 354 to determine any other storage objects that needed to be exported in order to export the target storage object. After considering all groups to which the target storage object belongs in order to determine whether any additional storage objects need to be exported to make the export of the target storage object valid and if the export of all additional storage objects was successful, control proceeds to block 380 to export the target storage object. By block 380, any other storage objects needed to be exported in order to export the target storage object would have been exported through the recursive calls to the logic of FIG. 9 at block 372.

During the import process, the storage management server 10 receiving the exported storage objects would check whether all storage objects in groups in which the target storage object are included in the import to verify that all storage objects are being imported. In other words, a check similar to that performed in FIG. 9 would be performed to determine that for any storage object included in the import any additional storage objects needed for the validity of the storage object are included in the import operation. This check would be recursive to determine whether any further additional storage objects needed for the additional storage objects are being imported.

Described implementations provide techniques for maintaining storage objects in different types of groups and allowing for the management of those group that ensures the consistency of the storage objects as members of different groups.

Additional Implementation Details

The described storage management logic may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable media, such as magnetic storage media (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.) Code in the computer readable media is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing media known in the art.

In the described implementations, the storage management server was maintained in a server that provided access for multiple clients to a file system in the server. In alternative implementations, the storage management program may be used to store files on a standalone system that is not within a client/server environment. In such case, the operations described as performed by the client and server storage management programs would be performed on a same system.

In the described implementations, the storage management operations that were performed depending on the type of group to which the storage objects belonged concerned deletion or expiration related operations. In further implementations, other storage management operations, other than deletion or expiration, may be implemented differently depending on the type of group to which the storage object subject to the operation belongs.

FIG. 10 illustrates one implementation of the architecture of the server 2 and clients 4a and 4b. These systems 2, 4a, and 4b may implement a computer architecture 400 having a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network.

FIGS. 2a and 2b illustrate a particular arrangement of a storage object entry and group entry. In alternative implementations, the storage object entry and group entry may include additional information fields, fewer information fields or a different arrangement of the information into the fields. Further, the information maintained for the storage object and group entries may be stored in different information and data structure formats than those described with respect to FIGS. 2a and 2b.

The described implementations discussed three different group types, peer, delta, and attribute. In further implementations, other group types may be assigned to groups.

The flowcharts of FIGS. 3-9 described specific operations occurring in a particular order. However, those skilled in the art will appreciate that the logic described with respect to the flowcharts may be modified in that steps may be added, consolidated or modified. Further, operations described as being performed sequentially may, in certain instances, be performed in parallel. Yet further, the operations described may be performed by a single processor or distributed across multiple processors.

Therefore, the foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture for managing storage objects, wherein the article of manufacture comprises a device including code that when executed causes operations to be performed, the operations comprising:
   providing storage object information for each storage object, wherein the storage object information indicates at least one of a plurality of groups associated with the storage object, and wherein each storage object is capable of being associated with a plurality of groups and different group types;
   providing group information for each group indicating a group identifier, storage objects associated with the group, and a group type, wherein the group type indicates a relationship of the storage objects associated with the group;
   initiating a storage object management operation to remove one of the storage objects;
   determining a group type of one group with which the storage object to remove is associated;
   processing at least one additional storage object associated with the group with which the storage object to remove is associated to perform the storage object remove operation, wherein different group type specific operations are performed to process the at least one additional storage object to implement the storage object remove operation for different group types; and
   processing storage object information for the storage object to remove, wherein information on all the groups associated with the storage object to remove are processed before removing the storage object information.

2. The article of manufacture of claim 1, further comprising:
   performing storage management operations on storage objects that are dependent on the group type to which the storage object belongs, wherein one storage operation performed with respect to a target storage object is implemented differently depending on the group to which the target storage object belongs.

3. The article of manufacture of claim 1, wherein the group types capable of being indicated in the storage object information include a peer group type, a delta group type, and an attribute group type.

4. The article of manufacture of claim 1, wherein the group types include a peer group type, and wherein a storage object that is a member of a peer group can only be removed if all members of the peer group are removed.

5. The article of manufacture of claim 1, wherein the operation to remove the storage object is part of an operation to expire the storage object, wherein the group types include a delta group type, and wherein a storage object that is a member of a delta group is only expired if the storage object comprises a delta storage object with respect to a base storage object or if the storage object comprises the base storage object and there are no delta storage objects in the delta group.

6. The article of manufacture of claim 1, wherein the group types include an attribute group type, and wherein a storage object that is a member of an attribute group is removed by removing the storage object information for the storage object if the storage object is an attribute of a base object or by removing storage object information for storage objects associated with the attribute group if the storage object is the base object for which the attribute provides metadata.

7. The article of manufacture of claim 1, further comprising:
   processing storage object information for one storage object to remove; and
   if the storage object is a member of multiple groups, then removing the storage object by modifying the storage object information to remove a group identifier of one group from which the storage object can be removed, wherein the storage object information is capable of indicating multiple groups to which the storage object belongs.

8. The article of manufacture of claim 7, further comprising:
   deleting the storage object information if removing the group identifier leaves the storage object entry associated with no groups.

9. The article of manufacture of claim 1, wherein the storage object is removed as part of an expiration operation, wherein the processing of the at least one additional storage object further comprises:

if the storage object to remove is a member of a peer group and is a group leader, then modifying the storage object information for the members of the peer group to remove the association of the storage objects to the peer group; and removing the group information for the peer group if the storage object is the group leader of the peer group.

10. The article of manufacture of claim 1, wherein the storage object entry remains a member of the peer group if the storage object is not the group leader of the peer group.

11. The article of manufacture of claim 1, wherein the storage object is processed to remove as part of an expiration operation, further comprising:

if the storage object to remove is a member of a delta group and is not a group leader, then modifying the storage object information for the storage object to remove the association of the storage object and the delta group; and wherein the processing of the at least one additional storage object further comprises if the storage object to remove is the group leader of the delta group, then delaying the removal of the association of the storage object and the delta group until all members of the delta group other than the group leader are removed.

12. The article of manufacture of claim 1, wherein the storage object is processed to remove as part of an expiration operation, further comprising:

if the storage object to remove is a member of an attribute group and is not a group leader, then modifying the storage object information for the storage object to remove and the group information for the delta group to indicate that the storage object to remove is not a member of the attribute group; and wherein the processing of the at least one additional storage object further comprises if the storage object to remove is the group leader of the attribute group, then deleting all members of the attribute group to indicate that the storage object members of the attribute group are not members of the attribute group and deleting the group information for the attribute group.

13. The article of manufacture of claim 1, wherein the storage object is processed to remove as part of a volume deletion, further comprising:

determining the groups to which the storage object to remove belongs;

removing the association of the storage object to remove and all group information for groups associated with the storage object to remove; and deleting the storage object information for the storage object to remove.

14. The article of manufacture of claim 13, wherein the processing of the at least one additional storage object further comprises:

if the storage object to remove is a member of one peer group, then deleting the group information associated with the peer group and modifying the storage object information representing the storage objects associated with the peer group to indicate that the storage objects are not members of the peer group;

if the storage object to remove is a member of one attribute or delta group and the group leader, then modifying the storage object information for the storage objects that are associated with the delta or attribute group to indicate that the storage objects are not associated with the delta or attribute group; and if the storage object to remove is a member of one attribute or delta group and not the group leader, then modifying the group information for the delta or attribute group to indicate that the storage object to remove is not a member of the delta or attribute group.

15. The article of manufacture of claim 1, wherein an additional operation to process the storage object is to export the storage object, further comprising:

processing storage object information for one storage object to export, wherein information on all the groups associated with the processed storage object are processed before exporting the storage object information;

determining the groups to which the storage object to export belongs, wherein the processing of the at least one additional storage object further comprises exporting any storage objects associated with the determined groups that are required to be associated with the exported storage object.

16. The article of manufacture of claim 15, wherein exporting the storage objects comprises exporting all storage objects that are associated with the determined groups that are peer groups and where the storage object to export is the group leader, further comprising:

failing the export of the storage object if the storage object is not the group leader of all the peer groups associated with the storage object.

17. The article of manufacture of claim 15, wherein exporting the storage object comprises exporting storage objects that are group leaders of delta groups included in the determined groups if the storage object to export is not the group leader.

18. The article of manufacture of claim 15, further comprising:

failing the export if the storage objects that are members of the determined groups that are required to be exported with the storage object cannot be exported.

19. The article of manufacture of claim 1, further comprising:

determining the groups to which a storage object to import belongs;

determining whether any storage objects associated with the determined groups that are required to be associated with the storage object to import are available; and allowing the import of the storage object to proceed if all the storage objects in the determined groups that are required to be associated with the imported storage object are available.

20. The article of manufacture of claim 1, wherein different group types have different management requirements.

21. The article of manufacture of claim 1, wherein the storage object information comprises a storage object entry and the group information comprises a group object in a database.

22. A system for managing storage objects, comprising:

a computer readable device;

a storage;

storage objects included in the storage;

storage object information in the computer readable device for each storage object, wherein the storage object information indicates at least one of a plurality of groups associated with the storage object, and wherein each storage object is capable of being associated with a plurality of groups; and group information in the computer readable device for each group indicating a group identifier, storage objects associated with the group, and a group type, wherein the group type indicates a relationship of the storage objects associated with the group;

a storage management server for performing operations, the operations comprising:

initiating a storage object management operation to remove one of the storage objects;

determining a group type of one group with which the storage object to remove is associated;

processing at least one additional storage object associated with the group with which the storage object to remove is associated to perform the storage object remove operation, wherein different group type specific operations are performed to process the at least one additional storage object to implement the storage object remove operation for different group types;

processing storage object information for one storage object to remove, wherein information on all the groups associated with the storage object to remove are processed before removing the storage object information.

23. The system of claim 22, wherein the operations performed by the storage management server further comprise:

performing storage management operations on storage objects that are dependent on the type of group to which the storage object belongs, wherein one storage operation performed with respect to a target storage object is implemented differently depending on the group to which the target storage object belongs.

24. The system of claim 22, wherein each storage object is capable of being associated with a plurality of groups, wherein at least two of the associated groups are different group types.

25. The system of claim 22, wherein the group types include a peer group type, and wherein a storage object that is a member of a peer group can only be removed if all members of the peer group are removed.

26. The system of claim 22, wherein the operation to remove the storage object is part of an operation to expire the storage object, wherein the group types include a delta group type, and wherein a storage object that is a member of a delta group is only expired if the storage object comprises a delta storage object with respect to a base storage object or if the storage object comprises the base storage object and there are no delta storage objects in the delta group.

27. The system of claim 22, wherein the group types include an attribute group type, and wherein a storage object that is a member of an attribute group is removed by removing the storage object information for the storage object if the storage object is an attribute of a base object or by removing storage object information for all storage objects associated with the attribute group if the storage object is the base object for which the attribute provides metadata.

28. The system of claim 22, wherein the operations performed by the storage management server further comprise:

processing storage object information for one storage object to remove; and removing the storage object, if the storage object is a member of multiple groups, by modifying the storage object entry to remove a group identifier of one group from which the storage object can be removed, wherein the storage object entry is capable of indicating multiple groups to which the storage object belongs.

29. The system of claim 22, wherein the storage object is removed as part of an expiration operation, wherein the processing the at least one additional storage object further comprises:

modifying, if the storage object to remove is a member of a peer group and is the group leader, the storage object information for the members of the peer group to remove the association of the storage objects to the peer group; and removing the group information for the peer group if the storage object is the group leader of the peer group.

30. The system of claim 22, wherein the storage object is processed to remove as part of an expiration operation, wherein the operations performed by the storage management server further comprise:

modifying, if the storage object to remove is a member of a delta group and is not the group leader, the storage object information for the storage object to remove the association of the storage object and the delta group; and wherein the processing the at least one additional storage object further comprises delaying, if the storage object to remove is the group leader of the delta group, the removal of the association of the storage object and the delta group until all members of the delta group other than the group leader are removed.

31. The system of claim 22, wherein the storage object is processed to remove as part of a volume deletion, wherein the operations performed by the storage management server further comprise:

determining the groups to which the storage object to remove belongs;

removing the association of the storage object to remove and all group information for groups associated with the storage object to remove; and deleting the storage object information associated with the storage object to remove.

32. The system of claim 22, wherein an additional operation to process the storage object is to export the storage object, wherein the operations performed by the storage management server further comprise:

processing storage object information for one storage object to export, wherein information on all the groups associated with the processed storage object are processed before exporting the storage object information;

determining the groups to which the storage object to export belongs; and wherein the processing the at least one additional storage object further comprises exporting any storage objects associated with the determined groups that are required to be associated with the exported storage object.

33. The system of manufacture of claim 22, wherein different group types have different management requirements.

34. A computerized method for managing storage objects, comprising:

providing storage object information for each storage object, wherein the storage object information indicates at least one of a plurality of groups associated with the storage object, and wherein each storage object is capable of being associated with a plurality of groups;

providing group information for each group indicating a group identifier, storage objects associated with the group, and a group type, wherein the group type indicates a relationship of the storage objects associated with the group;

initiating a storage object management operation to remove one of the storage objects;

determining a group type of one group with which the storage object to remove is associated;

processing at least one additional storage object associated with the group with which the storage object to remove is associated to perform the storage object remove operation, wherein different group type specific operations are performed to process the at least one additional storage object to implement the storage object remove operation for different group types; and processing storage object information for one storage object to remove, wherein information on all the groups associated with the storage object to remove are processed before removing the storage object information.

35. The method of claim 34, further comprising:
performing storage management operations on storage objects that are dependent on the type of group to which the storage object belongs, wherein one storage operation performed with respect to a target storage object is implemented differently depending on the group to which the target storage object belongs.

36. The method of claim 34, wherein each storage object is capable of being associated with a plurality of groups, wherein at least two of the associated groups are different group types.

37. The method of claim 34, wherein the group types include a peer group type, and wherein a storage object that is a member of a peer group can only be removed if all members of the peer group are removed.

38. The method of claim 34, wherein the operation to remove the storage object is part of an operation to expire the storage object, wherein the group types include a delta group type, and wherein a storage object that is a member of a delta group is only expired if the storage object comprises a delta storage object with respect to a base storage object or if the storage object comprises the base storage object and there are no delta storage objects in the delta group.

39. The method of claim 34, wherein the group types include an attribute group type, and wherein a storage object that is a member of an attribute group is removed by removing the storage object information for the storage object if the storage object is an attribute of a base object or by removing all storage object information for storage objects associated with the attribute group if the storage object is the base object for which the attribute provides metadata.

40. The method of claim 34, further comprising:
processing one storage object information for one storage object to remove; and
if the storage object is a member of multiple groups, then removing the storage object by modifying the storage object entry to remove a group identifier of one group from which the storage object can be removed, wherein the storage object entry is capable of indicating multiple groups to which the storage object belongs.

41. The method of claim 34, wherein different group types have different management requirements.

42. A computer readable device for managing storage objects, comprising:
storage object information for each storage object, wherein the storage object information indicates at least one of a plurality of groups associated with the storage object, and wherein each storage object is capable of being associated with a plurality of groups; and
group information for each group indicating a group identifier, storage objects associated with the group, and a group type, wherein the group type indicates a relationship of the storage objects associated with the group; wherein upon initiating a storage object management operation to remove one of the storage objects a determination is made of the group type of one group with which the storage object to remove is associated, and processing is performed with respect to at least one additional storage object associated with the group with which the storage object to remove is associated to perform the storage object remove operation, wherein different group type specific operations are performed to process the at least one additional storage object to implement the storage object remove operation for different group types, and wherein storage object information is processed for the storage object to remove, wherein information on all the groups associated with the storage object to remove are processed before removing the storage object information.

43. The computer readable device of claim 42, wherein storage management operations are performed on storage objects that are dependent on the type of group to which the storage object belongs, wherein one storage operation performed with respect to a target storage object is implemented differently depending on the group to which the target storage object belongs.

44. The computer readable device of claim 42, wherein each storage object is capable of being associated with a plurality of groups, wherein at least two of the associated groups are different group types.

45. The computer readable device of claim 42, wherein the group types include a peer group type, and wherein a storage object that is a member of a peer group can only be removed if all members of the peer group are removed.

46. The computer readable device of claim 42, wherein the group types include a delta group type, and wherein when the operation to remove the storage object is part of an operation to expire the storage object, a storage object that is a member of a delta group is only expired if the storage object comprises a delta storage object with respect to a base storage object or if the storage object comprises the base storage object and there are no delta storage objects in the delta group.

47. The computer readable device of claim 42, wherein different group types have different management requirements.

48. The computer readable device of claim 42, wherein the storage object information comprises a storage object entry and the group information comprises a group object in a database.

* * * * *